US007423240B2

(12) United States Patent
Schwenke et al.

(10) Patent No.: US 7,423,240 B2
(45) Date of Patent: Sep. 9, 2008

(54) PULSE WIDTH MODULATED DEFROSTER

(75) Inventors: Robert Schwenke, Fowlerville, MI (US); Keith D. Weiss, Fenton, MI (US)

(73) Assignee: Exatec LLC, Wixom, MI (US)

( * ) Notice: Subject to any disclaimer, the term of this patent is extended or adjusted under 35 U.S.C. 154(b) by 84 days.

(21) Appl. No.: 11/327,594

(22) Filed: Jan. 6, 2006

(65) Prior Publication Data

US 2006/0186835 A1 Aug. 24, 2006

Related U.S. Application Data

(60) Provisional application No. 60/655,936, filed on Feb. 24, 2005.

(51) Int. Cl.
*B60L 1/02* (2006.01)

(52) U.S. Cl. ....................... 219/203; 219/202; 219/200; 219/482; 219/494; 219/497; 219/501; 219/483; 219/492

(58) Field of Classification Search ................. 219/200, 219/202, 203, 482, 494, 497, 501, 483, 492
See application file for complete search history.

(56) References Cited

U.S. PATENT DOCUMENTS 4,357,524 A 11/1982 Apfelbeck et al.
5,496,989 A * 3/1996 Bradford et al. ............ 219/497
5,624,591 A 4/1997 Di Trapani
5,932,128 A * 8/1999 Dishop ....................... 219/505

FOREIGN PATENT DOCUMENTS

GB 2 261 333 A 5/1993

OTHER PUBLICATIONS

Andy Lindsay, What's a Microcontroller?, Student Guide, Version 2.1, Parallax Inc., pp. 1-232, Copyright 2003.
W. Hill, P. Horowitz, The Art of Electronics, Cambridge University Press, 1989, ISBN 0-521-37095-7.
Digi-Key Catalog No. T041, Jan.-Apr. 2004.

* cited by examiner

*Primary Examiner*—Shawntina Fuqua
(74) *Attorney, Agent, or Firm*—Brinks Hofer Gilson & Lione

(57) ABSTRACT

A window defroster system that includes a heater grid and a controller. The controller includes a pulse width modulator configured to provide a driving signal to the heater grid. The driving signal has an initial heating portion and a pulsed portion. The initial heating portion provides an initial voltage that is greater than an optimal operating voltage of the heater grid, the pulsed portion provides a pulsed signal with a pulsed high voltage that is greater than the optimal operating voltage.

11 Claims, 2 Drawing Sheets

PULSE WIDTH MODULATED DEFROSTER

RELATED APPLICATION

This application claims the benefit of U.S. provisional application entitled "DEFROSTERS FOR PLASTIC PANELS HAVING OPTIMIZED PERFORMANCE", application No. 60/655,936 filed on Feb. 24, 2005.

BACKGROUND

1. Field of the Invention

The present invention generally relates to a system for defrosting a transparent plastic panel.

2. Description of Related Art

Plastic windows, such as polycarbonate windows, have recently become available as an alternative to glass windows. In vehicle applications, plastic windows may provide a significant reduction in weight, as well as, provide other attractive attributes. However, lower electrical conductivity has been exhibited by conductive pastes printed and cured on plastic substrates, when compared to sintered metallic pastes printed on glass substrates. In addition, lower thermal conductivity is also typically exhibited by plastics as compared to glass. As a result, heater grid functionality further suffers when long grid lines are required on a plastic panel, such as a rear window. As seen from the above, there is a need in the industry to enhance and optimize the amount of heat generated and dissipated during a defrosting cycle in order to provide acceptable heater grids for large windows.

Some defroster grid patterns work very well at voltages well below the battery voltage present in an automobile. For such systems, applying the battery voltage, (typically about 13 volts) may result in overheating of the grid, possible melting of the plastic panel or destruction of the defroster grid itself. As a result, the utilization of these defroster grids requires a high wattage resistor to be connected in electrical series with the defroster grid to step down the voltage. For example, if a defroster grid pattern has an optimum operation voltage of around seven volts, a resistor would be required that dissipates almost 89% of the power used by the defroster itself. Therefore, the defroster circuit in the vehicle would be required to handle almost twice the power actually used by the defrosting grid. In addition, the resistor itself would generate a large amount of heat that must be separately managed.

In view of the above, it is apparent that there exists a need for an improved system for defrosting plastic windows in vehicle applications.

SUMMARY

In satisfying the above need, as well as overcoming the enumerated drawbacks and other limitations of the related art, the present invention provides an improved system for defrosting a plastic window.

The system includes a heater grid and a controller. The heater grid is attached to the plastic panel and is in electrical communication with the controller. The controller includes a pulse width modulator configured to provide a driving signal to the heater grid. The driving signal may have an initial heating portion and a pulsed portion. The initial heating portion provides an initial voltage across the heater grid that is greater than the optimal operating voltage of the heater grid. The initial voltage overdrives the heater grid quickly heating it to a temperature at or about the temperature provided by the optimal operating voltage. The pulsed portion provides a pulsed signal with a pulsed high voltage greater than the optimal operating voltage. However, the pulsed portion provides the heater grid with an effective voltage substantially equal to the optimal operating voltage of the heater grid due to the duty cycle of the pulsed portion.

Further objects, features, and advantages of this invention will become readily apparent to persons skilled in the art after a review of the following description, with reference to the drawings and claims that are appended to and form a part of this specification.

DETAILED DESCRIPTION

Figure 1:
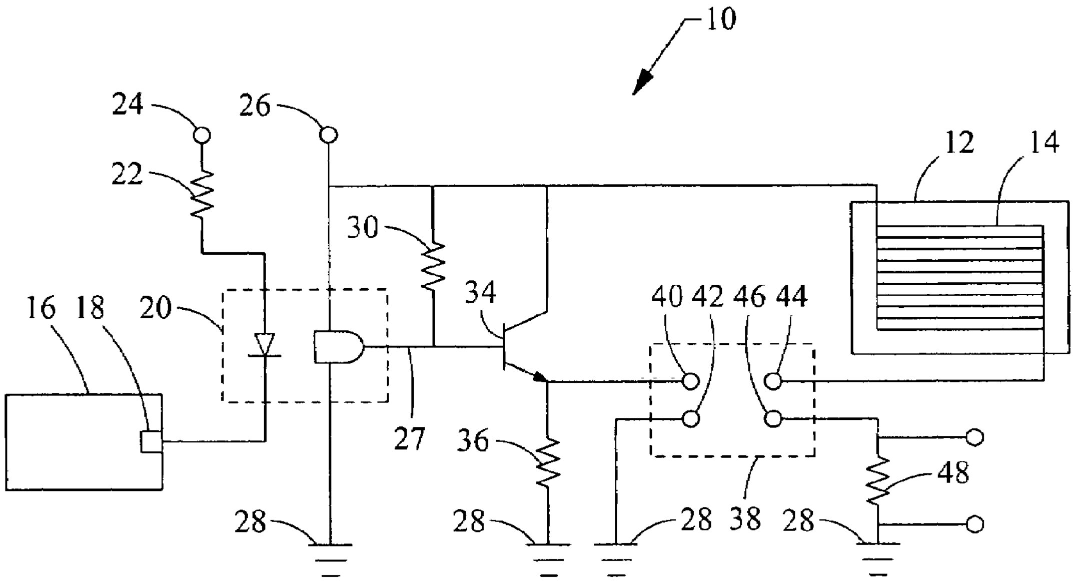
FIG. 1 is a schematic view of one of many systems capable of defrosting a plastic window in accordance with the present invention.

Referring now to FIG. 1, a system embodying the principles of the present invention is illustrated therein and designated at 10. As its primary components, the system 10 includes a heater grid 14 and a controller 16.

The heater grid 14 is attached to a plastic window 12 and is in electrical communication with the controller 16. The window 12 may be comprised of a plastic panel, such as a polycarbonate material, and may include one or more layers or coatings, for protection against such things as, without limitation, abrasion and ultra-violet light. The microcontroller 16 includes a pulse width modulator 18 configured to provide a driving signal to the heater grid 14. The driving signal provides a voltage across the heater grid 14 causing the heater grid 14 to emit heat energy to thereby defrost the window 12. The controller 16 may be a microcontroller chip with a built-in pulse width modulator or may comprise a number of control circuits including a pulsing circuit, such as a timer circuit, to form a pulse width modulator that generates a pulsed portion of the driving signal.

In one embodiment of the present invention, the controller 16 is isolated from the heater grid 14 through an opto-isolator 20, to protect the controller 16 from the current needed to drive the heater grid 14. As such, the input side of the opto-isolator 20 is connected to a voltage source 24 through a load resistor 22. The pulse width modulator 18 provides a ground path to the input side of the opto-isolator 20 based on the timing of the pulse width modulator 18. The output side of the opto-isolator 20 is in electrical communication with the heater grid 14 to communicate the driving signal. A voltage source 26, such as the vehicle battery, is also in electrical communication with the output side of the opto-isolator 20 to power the output of the opto-isolator 20. In addition, the output side of the opto-isolator 20 is also in electrical communication with an electrical ground 28 to provide a reference voltage for the output of the opto-isolator 20. Output of the opto-isolator 20 is electrically communicated along line 27 with the base of transistor 34, shown as a bipolar transistor, to drive a solid state relay 38 and communicate the driving signal to the heater grid 14. In addition, a load resistor 30 is connected between the base and the collector of transistor 34. Further, to provide current through the transistor 34 to drive the solid state relay 38, the collector of transistor 34 is connected to power source 26 and the emitter of driving transistor 34 is in electrical communication with electrical ground 28 through resistor 36.

As indicated above, the emitter of driving transistor 34 is in electrical communication with a first input 40 of solid state relay 38 to pulse current through the heater grid 14. A second input 42 of the solid state relay 38 is in electrical communication with electrical ground 28. When a voltage is provided across the first and second input 40, 42, current is allowed to flow between a first output 44 and a second output 46 of the solid state relay 38. Therefore, to provide an electric current to the heater grid 14, a first side of the heater grid 14 is in electrical communication with the power source 26 while a second side of the heater grid 14 is in electrical series connection with the first output 44 of the solid state relay 38. When the output from the pulse width modulator 18 is high, the solid state relay 38 activates allowing current to flow between the first and second output 44, 46. The second output 46 is in electrical communication with an electrical ground 28 through a shunt resistor 48. Accordingly, current will flow from the power source 26 through the heater grid 14, then to electrical ground through the solid state relay 38.

Figure 2:
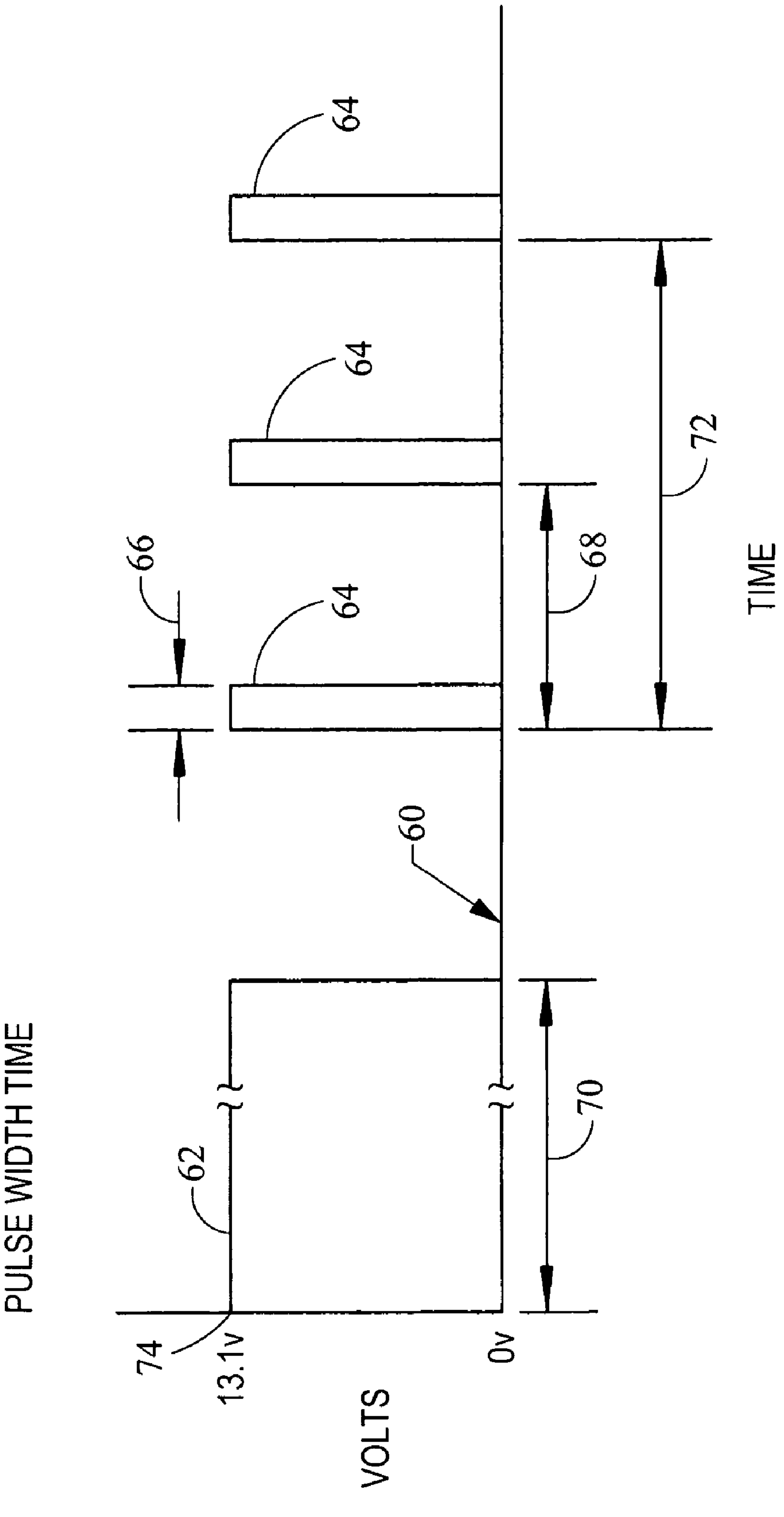
FIG. 2 is a graph of one possible driving signal that can be used with a heater grid in accordance with the present invention.

The power source 26 is configured to provide a voltage greater than the optimal operating voltage of the heater grid 14. The optimal operating voltage of the heater grid 14 is based on the specific characteristics of the heater grid, as well as the physical characteristics of the window 12. The optimal operating voltage is the DC voltage at which the heater 14 will emit the maximum amount of heat that will not damage the window 12 or the heater grid 14 itself at steady state conditions. For example, a graph of one possible driving signal 60 is provided in FIG. 2. Possible driving signals include but are not limited to sine waves, triangular waves, sawtooth waves, and square waves.

The driving signal 60 includes an initial heating portion 70 and a pulsed portion 72. During the initial heating portion 70, the driving signal 60 is set at a voltage 74 that is greater than the optimal operating voltage for the heater grid 14. As such, the heater grid 14 is overdriven during the initial heating portion 70 allowing the heater to quickly reach a maximum temperature at or about the temperature generated by the heating grid 14 at the optimal operating voltage. Then, the pulse width modulator 18 generates the pulsed portion 72 of the driving signal 60. The pulsed portion 72 includes a series of pulses 64 that are provided at a pulse voltage 74 that is greater than the optimal operating voltage of the heater grid 14. The pulses 64 are provided at a regular interval shown as period 68, and the duration of the pulses 64 are shown as pulse width 66. Accordingly, the duty cycle of the pulsed portion 72 is determined based on the pulse width 66 of the pulses 64 in comparison to the period 68. As such, the short duration of the pulses 64 allows a larger voltage to be supplied in a non-steady state fashion, thereby providing an effective voltage lower than the pulse voltage 74. Further, the effective voltage may be provided at or below the optimal operating voltage of the heater grid 14. For example, the effective voltage for a square wave is calculated in accordance with equation 1 below.

$$\text{Effective Voltage}=\text{Applied Voltage}*\text{Pulse Width (seconds)}*\text{Frequency} \quad (1)$$

Figure 3:
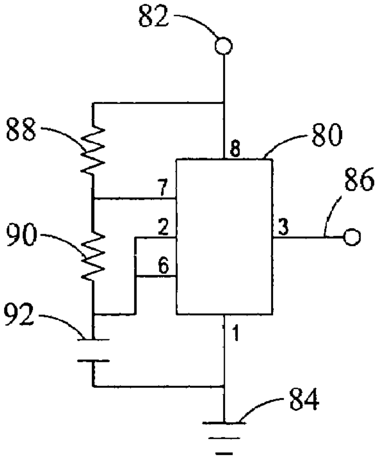
FIG. 3 is a schematic view of an example of a timer circuit in accordance with the present invention.

For typical automotive windshield or backlight applications, the length of the initial heating portion 70 will be larger than the pulse width 66 of the pulsed portion 72 and, typically, larger than the period 68 of the pulsed portion 72. In some cases, the initial heating portion 70 may last for a number of seconds. However, the period of the pulsed portion will typically be less than 500 ms. and the pulse width will, typically, be less than 200 ms. although longer periods and pulse widths may be used. As discussed above, the pulse width modulator 18 may comprise a timer circuit 78. The time circuit 78, one embodiment of which is shown in FIG. 3, includes a timer chip 80, such as a 555 timer chip as known in the electronics field.

For background purposes, pins of the 555 timer chip having industry standard functionality according to Table 1 below:

TABLE 1

| | |
|---|---|
| PIN 1 | OV Power Supply |
| PIN 2 | Trigger |
| PIN 3 | Output |
| PIN 4 | Reset |
| PIN 5 | Offset |
| PIN 6 | Threshold |
| PIN 7 | Discharge |
| PIN 8 | VS Power Supply |

In the timer circuit 78, pin 8 of the timer chip is in electrical communication with a voltage source 82, and a resistor 88 is provided between pins 7 and 8. A first side of another resistor 90 is also connected to pin 7, while a second side of the resistor 90 is connected to pins 2 and 6. In addition, a capacitor 82 is connected on one side to pins 2 and 6 and on another side to electrical ground 84 and pin 1. The remaining pin, pin 3, accordingly provides a pulsed signal 86 from the timer chip 80. According to the configurations shown, the frequency of the pulse signal 86 may be calculated in accordance with equation 2, while the duty cycle may be calculated in accordance with equation 3, both of which are provided below, in which C=the capacitance of capacitor 82, R1=the resistance of resistor 88, and R2=the resistance of resistor 90.

$$\text{Frequency}=[0.693*C*(R1+2*R2)] \quad (2)$$

$$\text{Duty Cycle}=(R1+R2)/(R1+2*R2) \quad (3)$$

Pulse width modulation was used to control a prototype defroster. This prototype defroster is a horizontal defroster with an additional bus bar located in the center of the pattern to assist in reducing the overall resistance of the pattern (power can be center fed, effectively cutting the pattern/resistance in half). The data confirming this result is provided in Table 2.

TABLE 2

| V applied | V shunt | Current | Temp | Ω Calc |
|---|---|---|---|---|
| 6.058 V | 19.4 mV | 9.7 A | 33° C. | 0.624536 |
| 7.15 | 22.4 | 11.2 | 39.8 | 0.638393 |
| 8.08 | 24.8 | 12.4 | 52.6 | 0.651613 |
| 9.07 | 27 | 13.5 | 59.6 | 0.671852 |
| 9.9 | 28.8 | 14.4 | 72.1 | 0.687500 |

Where:
V applied is the applied voltage as measured across the terminals of the defroster
V shunt is the voltage measured across the shunt
Current is calculated by I = (V shunt)/(R shunt), with R shunt = 0.002Ω
Temp is the temperature in the center of the defroster pattern
Ω Calc is the calculated defroster resistance Next, an effective operating voltage of 6.35 volts was used to power the defroster pattern. At this effective voltage, the pattern reached 70.5° C. and drew 9 amps of current. This effective voltage was achieved with a 12 ms pulse width at 46 Hz and corresponds to a duty cycle of 55%. The data confirming these results is provided in Table 3.

TABLE 3

| V Effective | V Shunt | Current | Temp | Ω Calc | Hz | PW |
|---|---|---|---|---|---|---|
| 1.94V | 6 mV | 3 A | 31.2° C. | 0.646667 | 78.3 | 2 ms |
| 3.35 | 11 | 5.5 | 39.2 | 0.609091 | 67.6 | 4 |
| 4.42 | 14 | 7 | 49.4 | 0.631429 | 59.55 | 6 |
| 5.26 | 16 | 8 | 5.82 | 0.6575 | 53.2 | 8 |
| 5.63 | 17 | 8.5 | 61.9 | 0.662353 | 50.5 | 9 |
| 5.96 | 18 | 9 | 67.8 | 0.662222 | 48.09 | 10 |
| 6.35 | 18 | 9 | 70.5 | 0.705556 | 45.87 | 12 |

Where:
V effective is the voltage as measured across the terminals of the defroster
Hz is the measured frequency
PW is the measured pulse width The defroster was then cooled to −20° C. A thermocouple was placed in the middle of the defroster pattern and monitored while the defroster was subjected to 5.13 volts from 10 to 340 Hz. The defroster was found to heat the defroster pattern to 10° C. in between 144 second and 159 seconds. This degree of temperature increase is capable of defrosting an automotive window under the described test conditions.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A system for defrosting a plastic window in a vehicle, the system comprising:

a heater grid attached to a transparent plastic panel;

a controller in electrical communication with the heater grid, the controller including a pulse width modulator configured to provide a pulse width modulated driving signal to the heater grid;

wherein the driving signal includes an initial heating portion and a pulsed portion, an initial voltage of the initial heating portion being greater than an optimal operating voltage for the heater grid that is generated during the pulsed portion.

2. A system for defrosting a plastic window in a vehicle, the system comprising:

a heater grid attached to a transparent plastic panel;

a controller in electrical communication with the heater grid, the controller including a pulse width modulator configured to provide a pulse width modulated driving signal to the heater grid;

wherein the driving signal includes an initial heating portion and a pulsed portion, the initial voltage of the initial heating portion being greater than an optimal operating voltage for the heater grid; and wherein the initial voltage of the initial heating portion is applied for a time period greater than a pulse width of the pulsed portion.

3. The system according to claim 2, wherein the initial voltage of the heating portion is applied for a time period greater than a period of the pulsed portion.

4. The system according to claim 3, wherein the driving signal includes a pulsed portion and the period of the pulsed portion is less than 500 milliseconds.

5. The system according to claim 4, wherein the pulse width is less than 200 milliseconds.

6. The system according to claim 1, wherein the plastic panel is formed of polycarbonate.

7. A system for defrosting a vehicle window, the system comprising:

a heater grid attached to a plastic window;

a controller in electrical communication with the heater grid, the controller being configured to provide a driving signal to the heater grid, the driving signal including a heating portion and a pulsed portion, the heating portion providing an initial voltage across the heater grid that is greater than an optimal operating voltage of the heater grid that is generated during the pulsed portion.

8. A system for defrosting a vehicle window, the system comprising:

a heater grid attached to a plastic window;

a controller in electrical communication with the heater grid, the controller being configured to provide a driving signal to the heater grid, the driving signal including a heating portion and a pulsed portion, the heating portion providing an initial voltage across the heater grid that is greater than an optimal operating voltage of the heater grid; and wherein the initial voltage of the heating portion is applied for a time period greater than a period of the pulsed portion.

9. The system according to claim 7, wherein the window is formed of polycarbonate.

10. A method for defrosting a plastic window having a heater grid attached thereto, the method comprising:

generating a driving signal having a heating portion and a pulsed portion, an initial voltage of the heating portion being greater than an optimal operating voltage of the heater grid during the pulsed portion, and an effective voltage of the pulsed portion being substantially equal to the optimal operating voltage; and applying the driving signal to the heater grid.

11. The method according to claim 10, further comprising:

generating the initial voltage across the heater grid greater than the optimal operating voltage of the heater grid for a time period longer than a pulse width of the pulsed portion.

* * * * *